United States Patent [19]

Chiang et al.

[11] 4,104,213

[45] Aug. 1, 1978

[54] STARCH REPLACEMENT FOR LATEX POLYMER

[75] Inventors: Mutong T. Chiang, Palos Heights; John P. Gibbons, Western Springs, both of Ill.

[73] Assignee: CPC International Inc., Englewood Cliffs, N.J.

[21] Appl. No.: 745,145

[22] Filed: Nov. 26, 1976

[51] Int. Cl.[2] .................................................. C08L 3/02

[52] U.S. Cl. ........................... 260/17.3; 260/17.4 ST; 426/578; 428/95; 536/102

[58] Field of Search ......................... 260/17.3, 17.4 ST

[56] References Cited

U.S. PATENT DOCUMENTS

| | | | |
|---|---|---|---|
| 2,246,635 | 6/1941 | Möeller | 260/17.2 |
| 3,060,072 | 10/1962 | Parlin | 428/95 |
| 3,485,776 | 12/1969 | Bruner et al. | 260/17.4 ST |
| 3,487,033 | 12/1969 | McElmury et al. | 260/17.3 |
| 3,864,195 | 2/1975 | Patterson | 428/95 |

*Primary Examiner*—Edward M. Woodberry
*Attorney, Agent, or Firm*—David H. LeRoy; John P. Floyd

[57] ABSTRACT

This invention discloses latex compositions wherein a specially treated, substantially non-birefringent, cold water swelling, granular starch product is used as a thickener and for partial replacement for the polymer in the latex.

25 Claims, No Drawings

STARCH REPLACEMENT FOR LATEX POLYMER

FIELD OF INVENTION

This invention relates to latex compositions containing a starch replacement for latex polymer comprising a specially prepared heat-moisture treated starch product.

BACKGROUND OF INVENTION

The use of various thickening agents to provide increased body and viscosity to latex compositions is well known. These thickening agents include natural gums, soluble cellulose derivatives, and a variety of high molecular weight synthetic polymers such as the sodium polyacrylate thickeners.

To obtain more economical latex compositions and provide desired viscosity and adhesive character, it is known in the art that 10 to 20% by weight of starch based on latex polymer solids may be used in latex formulations. However, the use of gelatinized or pregelatinized starches has certain drawbacks due to rheological effects which occur on aging. Starch pastes are exceedingly labile to shearing and hydrolyzing influences during processing and also in the latex compositions.

It is also known to use substantially non-birefringent, cold water swelling, granular starch products of natural and unmodified starch in latex compositions for purposes of increasing viscosity and improving the coating characteristics of the latex compositions. These starch products are substantially non-birefringent, cold water swelling, starch products having a moisture content below about 20% by weight and characterized as having a viscosity from about 150 to about 650 centipoise at 10 percent solids after being dispersed in water at 1500 rpm for 2 minutes.

Although the foregoing compositions have proved quite adequate in providing increased thickness and body of latex compositions, these compositions have not been used for replacement of latex polymer. Thus, these prior art compositions have been directed primarily toward obtaining the properties of increased thickness and viscosity rather than as an economical replacement for the petroleum derived ingredients of such latex compositions. It is the latter use which currently has become so important as the attention of the industry becomes focused upon the use of renewable resources as a substitute for limited petroleum reserves. Although starch products having thin-boiling, free-flowing characteristics have been known, for example see U.S. Pat. No. 3,067,064, it is believed that their use as a thickener in latex compositions has not been suggested, nor has their use as a latex replacement been suggested or taught in the prior art.

This invention provides novel and improved latex compositions wherein a partially swollen starch, having free-flowing, thin-boiling characteristics, is employed as a replacement for the latex polymer itself. These compositions have been found to be particularly suitable for use in the manufacture of carpet backing adhesives and employ novel pretreated starch compositions as partial replacement for styrene-butadiene (SBR) latex in such carpet-backing applications. As will be shown more fully hereafter, the novel modified starch compositions of this invention and the novel latex compositions produced therewith unexpectedly demonstrate superlative formulation properties for application in the manufacture of textile laminating compositions such as carpet backing. These properties are achieved without the necessity of having to employ a ternary mixture of modified starch, urea, and borax as is disclosed, for example, in U.S. Pat. No. 3,779,857.

SUMMARY OF INVENTION

This invention relates to a process for the production of a latex composition containing an improved substantially non-birefringent cold water swelling granular starch product as a thickener and as a partial replacement for the polymer in the latex which comprises the steps of:

(a) dispersing a preformed latex into water to adjust to the desired solids level;

(b) adding a substantially non-birefringent cold water swelling granular starch product characterized as having less than 10% solubles and a swelling power such that each 5 g. when dispersed in water and held for about 16 hours at 25° C. swells from about 20 ml. to about 35 ml.; and (c) mixing said latex and said starch product to obtain a smooth and uniform latex composition.

The present invention also relates to an improved latex composition which comprises:

(a) a latex; and (b) a substantially non-birefringent cold water swelling granular starch product characterized as having less than 10% solubles and a swelling power such that each 5 g. when dispersed in water and held for about 16 hours at 25° C. swells from about 20 ml. to about 35 ml.

The present invention also is directed to the use of a substantially non-birefringent cold water swelling granular starch product as a partial replacement for the polymer in latex compositions. The substantially non-birefringent, cold water swelling, granular starch product of this invention is produced by a heat-moisture treatment process comprising:

(a) uniformly heating a granular starch having a moisture content from 30% to about 40% to a temperature of at least about 170° F. (76.6° C.) to obtain a heat-moisture treated product; and (b) thereafter drying the heat-moisture treated product to a moisture content less than about 10% moisture. The dried heat-moisture treated product is substantially a non-birefringent cold water swelling granular starch product which may be optionally ground or milled to an extent that the average particle size is preferably less than 105 microns in size.

Another aspect of this invention is a latex composition containing an improved substantially non-birefringent, cold water swelling, granular starch product which is useful as a carpet backing adhesive.

The improved substantially non-birefringent cold water swelling granular starch product of this invention requires no inorganic dispersant or hydrophobic agents to be present. Furthermore, high solids, high loaded latex adhesive compositions for carpet backing have been prepared by partial replacement of latex with the improved substantially non-birefringent cold water swelling granular starch product prepared by the heat-moisture treatment process of this invention. Furthermore, the latex compositions of this invention advantageously do not require the use of conventional and expensive polymeric thickeners to maintain the stability and coatability for use in textile backing applications (although in certain instances the use of such additives in controlled amounts can result in certain improvements and economic advantages). These and other advantages will be more apparent from the following detailed discussions of the invention.

DESCRIPTION OF PREFERRED EMBODIMENTS

The large scale formulation of latex coating and laminating adhesive compositions is inherently difficult. Such mixtures commonly include from zero parts up to 600 parts of inorganic fillers per 100 parts of water insoluble base resin, dry basis weight. The fillers may for example be of the group including clay, ground chalk or limestone, calcium carbonate, titanium dioxide, blanc fixe, satin white, or the like. It is generally preferred to use as much filler as practical in the production of a desired end product since the filler is the least expensive ingredient. Factors which determine the maximum usable amount of filler are desired adhesive strength, water repellancy, and the like.

The type of latex polymers useful for latex coatings, laminates or adhesives varies with the application involved. For example, latexes for latex-based paints, paper coatings, or textile adhesives may consist of copolymers wherein the proportion of monomer units present are varied to give the desired property. Styrene-butadiene latices containing about 45 to about 75 percent styrene are suitable for paint formulations, paper coatings, and textile adhesives. Styrene-butadiene latices with over 70% styrene have not been as widely used in these applications. Other copolymerizable monomers, for example, carboxyl-containing monomers, are often used at low levels of addition to affect the final latex properties. Examples of other latices suitable for purposes of this invention are vinyl resins, acrylic resins, methacrylic resins, natural rubber, styrene resins, butadiene resins, and combinations thereof.

The final result of compounding must be a perfectly smooth and uniform fluid mass having a predetermined viscosity range as required for proper operation of the coating equipment. Difficulty occurs with the powdered inorganic fillers which have a tendency to flocculate and agglomerate. Difficulty may also occur in dispersing the exceptionally viscous polymeric thickeners and other components considered necessary in the mixture. Dry powdered cellulose derivatives and powdered pregelatinized starches are themselves difficult to disperse in water. Prior to this invention the substantially non-birefringent, cold water swelling, granular starch products shared this undesirable property unless mixed with an inorganic salt such as tricalcium monophosphate prior to dispersion into water or latex formulations. Furthermore, it was previously necessary to add agents which controlled hydrophobicity such as fatty acid salts, chemically derived fatty acid mineral hydrocarbons, and the like, along with the granular cold water swelling starch product. Moreover, the X-ray diffraction pattern of the starch product of this invention exhibits some crystallinity as evidenced by the presence of the "A" pattern, in contrast to the prior art non-birefringent, cold water swelling, granular starch product.

It has now been discovered that latex compositions containing an improved substantially non-birefringent, cold water swelling, granular starch product can be obtained by dispersing the improved substantially non-birefringent, cold water swelling, granular starch product prepared by a heat-moisture treatment process directly into the latex formulations. The improved substantially non-birefringent cold water swelling granular starch product requires no inorganic dispersant or hydrophobic agents to be present and therefore is free of these materials. Furthermore, the improved substantially non-birefringent cold water swelling granular starch product of this invention can be used to partially replace the aforementioned latex polymer compositions.

In the latex compositions of this invention the use of conventional expensive latex thickeners is reduced or eliminated while the stability and coatability of the adhesive latex composition remains unaffected.

According to this invention, high solids, high loaded latex adhesive compositions for carpet backing have been prepared by partial replacement of latex with the improved substantially non-birefringent, cold water swelling, granular starch product prepared by the heat-moisture treatment process. For carpet backing, the preferred latex is a styrene-butadiene resin having from about 45 to about 70 percent styrene.

The term "cold water swelling" is used herein to describe starch products which absorb water and swell on contact with an aqueous liquid. The substantially non-birefringent cold water swelling granular starch product of this invention has been rendered cold water swelling by a heat-moisture treatment under closely controlled conditions wherein granular starch having a moisture content of 30 to 40% is heated to a temperature of at least about 170° F. (76.6° C.) and thereafter dried to a moisture content less than about 10% moisture. The dried heat-moisture treated starch product may be ground or milled to obtain a desired particle size, preferably less than 105 microns in size.

According to the present invention production of the substantially non-birefringent cold water swelling granular starch product by the heat-moisture treatment involves agitation of the solid starch mass by procedures which vary moisture level, temperature and contact time with the starch, so that the starch produced has the proper solubles, swelling power and is substantially non-birefringent. For example, said procedures may involve steam injection cooking, fluid bed heating, or microwave heating. It is preferred that the steam injection procedure utilizing a Paterson-Kelly Blender as hereinafter described be employed.

The substantially non-birefringent cold water swelling granular starch product of the present invention is characterized as having less than 10% solubles, preferably less than 5% solubles in water at 25° C. and it is substantially non-birefringent, i.e. less than about 10% of the starch is birefringent as evidenced by the presence of the maltese cross pattern under polarized light when viewed under a microscope. The product when milled to a size of less than 105 microns is further characterized as having a swollen volume of at least 20 ml. and as high as 35 ml. under the following conditions:

Five grams of the milled starch is placed in 50 ml. of water and allowed to stand about 16 hours at room temperature. The starch that settles will occupy the designated volume. Solubles in the supernatant or unsettled portion should be less than 10% for the heat-moisture treated product. For comparison in this test an untreated natural corn starch will occupy a volume of 8.5 ml.

The substantially non-birefringent, cold water swelling, granular starch product of this invention is distinguishable over prior art starch products which are fully granular or fully gelatinized. The fully gelatinized products are dried under conditions that produce shards or fragments if dried under roll drying conditions or beadlets containing entrapped air if derived from spray drying. The substantially non-birefringent, cold water swelling, granular starch products of this invention are neither completely gelatinized nor fragmented and contain partially swollen non-birefringent starch granules.

The invention may be applied to all types of starches for example, those derived from waxy maize, corn, rice, potato, wheat, tapioca, etc. Furthermore, starch derivatives, oxidized starches, and thinned starches may be used provided these starch products are subjected to heat-moisture treatment to produce substantially non-birefringent, cold water swelling, granular starch products and used as a partial replacement for the polymer in the latex composition.

There are many types of latex compositions which are suitable for partial replacement of latex with the substantially non-birefringent, cold water swelling, granular starch product of this invention for use as a latex adhesive in a wide variety of applications. The latex adhesive compositions of this invention are useful in a wide variety of applications such as for laminating textiles and fabrics and in carpet backing.

The following examples are included to further illustrate the invention and are not to be construed as limitations thereto:

EXAMPLE I

Preparation of Heat-Moisture Treated Product 31.75 kg. dry corn starch at about 12% moisture was added to an 85 l. Patterson-Kelly Batch Blender. Water was added by pump to adjust the starch to 38% moisture during agitation. Steam at 1.05 kg/cm$^2$ was added during agitation until a temperature of 185° F.–190° F. was obtained and then steam was added periodically during a holdtime sufficient to give desired volume in the swollen volume test. The product was then removed and dried. The dried product for characterization was ground, for example, with a water-cooled Fitzmill to obtain a milled product less than 105 microns in size. Relationship of temperature, time, and swollen volume for heat-moisture treatment are given below:

| Test No. | Temp. ° F. | Hold Time (mins) | Swollen[a] Volume (ml) |
|---|---|---|---|
| 1 | 185 | 10 | 25.0 |
| 2 | 185 | 10 | 26.0 |
| 3 | 185 | 15 | 23.5 |
| 4 | 185 | 21 | 24.8 |
| 5 | 185 | 22 | 28.3 |
| 6 | 187 | 15 | 27.3 |
| 7 | 187 | 15 | 27.7 |
| 8 | 190 | 10 | 28.2 |
| 9 | 190 | 15 | 27.2 |
| 10 | 190 | 15 | 28.2 |

[a]Settled volume of 5 g. of starch when milled to a particle size of less than 105 microns and held in 50 ml. of water at room temperature for about 16 hours.

EXAMPLE II

Latex Composition (Control)

208 g. of Styrene-Butadiene (SBR) Latex (48% solids) was weighed in an 800 ml. beaker and 67 g. of distilled water was added. While stirring, 375 g. of calcium carbonate (Georgia Marble #9 NCS) was added slowly and dispersed in the latex. Then 10 g. of sodium polyacrylate thickener (13% solids) was added. Viscosity was determined to be 15,000 cps. by Brookfield Viscometer (#5 spindle, 20 rpm).

EXAMPLE III

Starch-Latex Composition 167 g. of Dow SBR Latex 893* (48% solids) was weighed in an 800 ml. beaker and 88 g. of distilled water was added. While stirring, 20 g. of heat-moisture treated starch prepared as in Example 1 having a swollen volume of 28 ml. and a particle size of less than 105 microns was added slowly, followed by 375 g. of calcium carbonate filler. Then, sodium polyacrylate thickener was added to adjust the viscosity to about 14,000 to 15,000 cps. The amount of thickener required to bring viscosity (Brookfield RVT #5 spindle, 20 rmp) to 14,200 cps. was determined to be 2.7 g. (13% solids) or 0.35 g. on dry basis. Total Solids: 73%, represents replacement of 20% of the latex solids and 73% of the thickener.

*As described in the Dow Bulletin (Form #191-94-71R) "Carpet Coating New Self-Cure Latexes for the Carpet Industry" for Dow SBR Latex 891, 892, 893.

Viscosity Stability Test

On standing for 3 days, viscosity was measured again by Brookfield as follows:

| Sample | Initial Viscosity, cps | Viscosity After 3 days, cps |
|---|---|---|
| Example II (control) | 15,000 | 17,200 |
| Example III | 14,200 | 14,600 |

EXAMPLE IV

Carpet Backing Delamination and Tuft Binding Tests 45 g. of the latex adhesive composition of Example II and Example III were coated on the back of 5 × 10 inch carpet, and a secondary backing of burlap was attached and dried in an oven at 300° F. for 15 minutes. Two 2 × 10 inch samples of laminated carpet were cut for backing delamination test (Federal Test Methods #191 July 17, 1974 and #5950 December 31, 1968) and one 1 × 10 inch sample for tuft bind test (ASTM D1335-67).

| Sample | Backing Delamination, lb./in. | Tuft Bind, lb. |
|---|---|---|
| Example II (control) | 3.25 | 12.5 |
| Example III | 4.5 | 13.2 |

EXAMPLE V

Higher Starch Content Latex Composition 146 g. of SBR latex (48% solids) was weighed in an 800 ml. beaker and 108 g. of distilled water was added. While stirring, 30 g. of heat-moisture treated starch prepared as in Example I having a swollen volume of 28 ml. and a particle size of less than 105 microns, was added slowly, followed by 375 g. of calcium carbonate filler. Without addition of any thickener, viscosity was determined to be exactly 14,000 cps. Total solids: 72% represents replacement of 30% of the latex solids and 100% of the thickener.

Backing delamination and tuft bind were determined as described in Example IV with the following results:

| Sample | Back Delamination lb./in. | Tuft Bind, lb. |
|---|---|---|
| Example V | 4.5 | 11.1 |

Viscosity Stability

Viscosity of adhesive compound did not change on standing for 3 days, i.e. viscosity stayed at 14,000 cps.

EXAMPLE VI

Effect of Swollen Starch Character

Five batches of heat-moisture treated starches were evaluated as latex extenders in terms of the physical properties of the starch. Physical properties of the starch products are as follows:

| H/M Starch | 1 | 2 | 3 | 4 | 5 |
|---|---|---|---|---|---|
| Swollen Volume, ml[a] | 33 | 28 | 22 | 20 | 28 |
| Solubles, %[b] | 1.8 | 2.0 | 1.4 | 2.2 | 2.7 |
| Particle Size, microns | <105 | <105 | <500 | [c] | [c] |

(α)Test Procedure: 5 g. of starch was mixed with 20 ml. of distilled water in a beaker and transferred into a 50 ml. graduated cylinder. Water was added to 50 ml. mark, and mixed thoroughly. After standing for about 16 hours, the volume occupied by swollen starch was determined.
(β)Water solubles at 25° C.
(c)An unscreened product, having about 7% of starch particles larger than 500 microns, about 80% of the particles between about 105 and to about 500 microns, and 13% of the particles less than about 105 microns.

In a standard carpet-backing adhesive formulation. 20% of SBR latex solid was replaced with each of the above-identified heat-moisture treated starches prepared as in Example I, and thickening efficiency of the starch and viscosity stability of adhesive compounds were determined.

Latex compositions were prepared as Example II with the following results:

| H/M Starch Sample | 1 | 2 | 3 | 4 | 5 | Example II Control |
|---|---|---|---|---|---|---|
| SBR Latex (48% solids), g | 167 | 167 | 167 | 167 | 167 | 208 |
| Water, g | 88 | 88 | 88 | 88 | 88 | 67 |
| H/M Starch, g | 20 | 20 | 20 | 20 | 20 | — |
| Whiting, g | 375 | 375 | 375 | 375 | 375 | 375 |
| Thickener, (solid) g | 0.22 | 0.35 | 0.50 | 0.65 | 0.56 | 10.0 |
| Initial Visc. cps. | 14000 | 14200 | 14000 | 15000 | 14400 | 15000 |
| Visc. after 3 days, cps | 14000 | 14600 | 14200 | 15200 | 16000 | 17200 |

Thickening efficiency of starch is directly related to swollen volume. The higher the swollen volume, the less the thickener (polyacrylic acid) is required. Viscosity stabilities of the adhesive latex compositions is excellent.

EXAMPLE VII

Carpet Backing Delamination and Tuft Binding Tests

Forty-five grams of each of the latex adhesive compositions of Example VI was coated on the back of a 5-inch by 10-inch piece of carpet, and secondary backing of burlap was attached to each and dried in an oven at 300° F. for 15 minutes. Backing delamination of tuft bind were determined as in Example IV as follows:

| H/M Starch Sample | 1 | 2 | 3 | 4 | 5 | Example II Control |
|---|---|---|---|---|---|---|
| Backing Delamination, lb./in. | 5.5 | 4.5 | 3.0 | 3.3 | 3.3 | 3.3 |
| Tuft Bind, lb. | 13.5 | 13.1 | 12.0 | 7.7 | 8.4 | 12.5 |

Backing delamination and tuft bind strength of the carpet are related to swollen volume and particle size of the starch. The starch with swollen volume of 28 to 33 ml. and particle size of less than 105 microns gave the best backing delamination and tuft bind strength.

EXAMPLE VIII

Effect of Starch Solids Level

In a standard carpet-backing adhesive formulation, 10, 20, 25, and 30 percent of the SBR latex was replaced with heat-moisture treated starch (swollen volume 33 ml.; particle size less than 105 microns), and thickening efficiency, viscosity, stability, backing delamination and tuft bind strength were determined by the methods of the previous examples with the following results:

| H/M Starch Sample | 6 | 1 | 7 | 8 |
|---|---|---|---|---|
| SBR Latex (48% solids) g | 187 | 167 | 156 | 146 |
| Water, g | 78 | 88 | 94 | 99+[a] |
| H/M Starch, g | 10 | 20 | 25 | 30 |
| Whiting, g | 375 | 375 | 375 | 375 |
| Thickener (solids) g | 0.59 | 0.22 | 0.05 | 0 |
| % Solids | 73 | 73 | 73 | 71.3 |
| Initial Viscosity, cps | 14000 | 14000 | 14000 | 14000 |
| Viscosity after 3 Days, cps | 14300 | 14000 | 14000 | Unstable[b] |
| Backing Delamination, lb./in. | 4.8 | 5.5 | 5.6 | 6.5 |
| Tuft Bind, lb. | 7.3 | 13.5 | 12.6 | 8.9 |

(a)Without addition of thickener, initial viscosity was over 20,000 cps. Additional 16 g. of water was added to adjust viscosity to 14,000 cps. (71.3% solids).
(b)Phase separation.

At higher levels of replacement, less thickener (sodium polyacrylate) is required. Viscosity stabilities were good up to 25 percent replacement. Backing delamination improves as the level of replacement increases. Tuft bind increases up to 25 percent replacement. At 30 percent replacement the product is acceptable for some applications.

EXAMPLE IX

Effect of Additives on Starch-Latex Compositions

In a carpet backing adhesive consisting of 80 g. of SBR latex, 20 g. of heat-moisture treated starch and 375 g. of calcium carbonate (Georgia Marble #9 NCS) as described in Example II, 15.4 g. of 65% solution of dimethylolurea (or 10 g. on solid basis) was added.

Forty-five grams of this adhesive compound was coated on the back of a 5-inch by 10-inch piece of carpet and a secondary backing of burlap was attached and dried in an oven at 300° F. for 15 minutes. Backing delamination and tuft bind were tested as described previously in Example IV as follows:

| | |
|---|---|
| Backing Delamination | 8.0 lb./in. |
| Tuft Bind | 13.6 lb. |

EXAMPLE X

Effect of Additives on Starch Extended Latex Compositions

A carpet backing adhesive compound consisting of 70 g. of SBR latex, 25 g. of heat-moisture treated starch, 5 g. of urea and 375 g. of calcium carbonate was prepared as described in Example II. Urea was added as a plasticizer.

Forty-five grams of adhesive compound was coated on the back of a 5-inch by 10-inch piece of carpet and a secondary backing of burlap was attached and dried in an oven at 300° F. for 15 minutes. The carpet is less stiff and more flexible. Backing delamination and tuft bind were tested as described previously.

| | |
|---|---|
| Backing Delamination | 8.0 lb./in. |
| Tuft Bind | 12.3 lb. |

The data presented in these examples further demonstrate the partial replacement of latex polymer with the substantially non-birefringent, cold water swelling, starch products of this invention. As described, the latex compositions of this invention may be used as latex adhesives or laminates in a wide variety of applications normally using latex compositions.

We claim:

1. In a latex composition comprising water, polymer solids and thickener, the improvement wherein said thickener comprises a substantially non-birefringent, cold water swelling, granular starch product having an "A" pattern X-ray diffraction and characterized as having less than 10% solubles and a swelling power such that 5 g. thereof dispersed in water for 16 hours at 25° C. swells from about 20 ml. to about 35 ml.

2. The latex composition of claim 1 wherein the latex is a styrene-butadiene resin.

3. The latex composition of claim 2 wherein the styrene-butadiene resin contains from about 45 to about 70 percent styrene.

4. The latex composition of claim 1 which further comprises a filler.

5. The latex composition of claim 4 wherein the filler is calcium carbonate.

6. The latex composition of claim 1 which further comprises a polymeric thickener.

7. The latex composition of claim 6 wherein the polymeric thickener is a polyacrylate polymer.

8. The latex composition of claim 1 wherein the cold water swelling, granular starch product is further characterized as having a particle size from about 2 to about 500 microns.

9. The latex composition of claim 8 wherein the swelling power is from about 28 ml. to about 35 ml.

10. The latex composition of claim 1 wherein the latex is a water insoluble base resin selected from the group of resins which comprise a vinyl resin, an acrylic resin, a methacrylic resin, a natural rubber, a styrene resin, a butadiene resin, and combinations thereof.

11. The latex composition of claim 1 wherein the starch product is starch.

12. A process for the production of the latex composition of claim 1 containing an improved substantially non-birefringent, cold water swelling, granular starch product as a thickener and as a partial replacement for the polymer in the latex which comprises the steps of:

(a) dispersing a preformed latex into water to adjust to the desired solids level;

(b) adding the starch product; and (c) mixing said latex and said starch product to obtain a smooth and uniform latex composition.

13. The process of claim 12 which further comprises adding a filler to the latex composition.

14. The process of claim 12 which further comprises adding a polymeric thickener to the latex composition.

15. A process for the production of the latex composition of claim 1 wherein the substantially non-birefringent, cold water swelling, granular starch product is produced by:

(a) uniformly heating a granular starch having a moisture content from about 30% to about 40% to a temperature of at least about 170° F. to obtain a heat-moisture treated product; and (b) drying the heat-moisture treated product to obtain a substantially non-birefringent, cold water swelling granular starch product having an "A" pattern X-ray diffraction and further characterized as having less than 10% solubles and a swelling power such that for each 5 g. when dispersed in water and held for about 16 hours at 25° C. swells from about 20 ml. to about 35 ml.

16. The improved latex carpet-backing adhesive composition of claim 1 wherein the resin solids are a styrene-butadiene resin latex containing from about 45 to about 70 percent styrene.

17. The latex composition of claim 16 which further comprises a filler.

18. The latex composition of claim 17 wherein the filler is calcium carbonate.

19. The latex composition of claim 16 which further comprises a polymeric thickener.

20. The latex composition of claim 19 wherein the polymeric thickener is a polyacrylate polymer.

21. The latex composition of claim 16 wherein the cold water swelling, granular starch product is further characterized as having a particle size from about 2 to about 500 microns.

22. The latex composition of claim 21 wherein the particle size of the cold water swelling, granular starch product is from about 2 to less than about 105 microns.

23. The latex composition of claim 16 wherein the swelling power is from about 28 ml. to about 35 ml.

24. The latex composition of claim 16 which further comprises dimethylolurea.

25. The latex composition of claim 16 which further comprises plasticizer.

* * * * *